US006222551B1

(12) United States Patent
Schneider et al.

(10) Patent No.: US 6,222,551 B1
(45) Date of Patent: Apr. 24, 2001

(54) METHODS AND APPARATUS FOR PROVIDING 3D VIEWPOINT SELECTION IN A SERVER/CLIENT ARRANGEMENT

(75) Inventors: Bengt-Olaf Schneider, Yorktown Heights; Ioana M Martin, Ossining, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/229,793

(22) Filed: Jan. 13, 1999

(51) Int. Cl.$^7$ ................................................ G06F 15/00
(52) U.S. Cl. ................................................ 345/419
(58) Field of Search ...................... 345/419, 420, 345/421, 422, 423, 428, 433, 435; 358/456

(56) References Cited

U.S. PATENT DOCUMENTS 5,448,686  9/1995  Borrel et al. ........................ 395/120
6,088,040  * 7/2000  Oda et al. ........................... 345/435

* cited by examiner

Primary Examiner—Phu Nguyen
(74) Attorney, Agent, or Firm—Perman & Green, LLP; Douglas W. Cameron

(57) ABSTRACT

A method and apparatus for operating a client/server graphics processing system of a type that includes a display and a user input device. A first step, executed at the server entity, renders a plurality views (e.g., six views) of a model of interest and transmits the plurality of views to the client entity. A next step, executed at the client, maps individual ones of the plurality of views onto individual ones of a plurality of faces of a structure (e.g., a cube) and displays the structure on the display. In response to the user manipulating the user input device, a next step, executed at the client, causes a manipulation of the structure displayed on the display for specifying a particular view direction relative to the model. Further in response to user input device, the client sends an indication to the server of the user-specified view direction, whereafter the server renders an image of the model, from the user-specified view direction, and transmits the rendered image back to the client for display to the user.

27 Claims, 8 Drawing Sheets

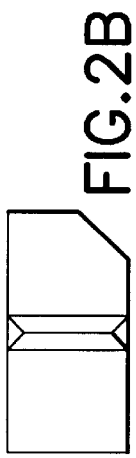
FIG.2B
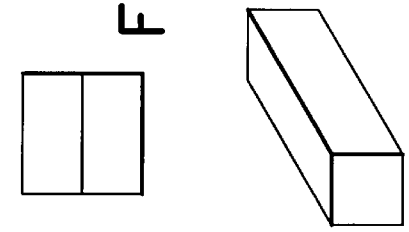
FIG.2C
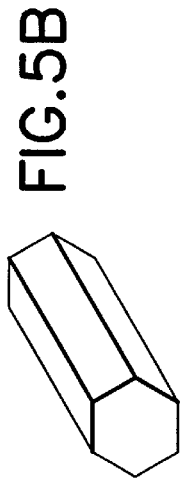
FIG.5A
FIG.5B
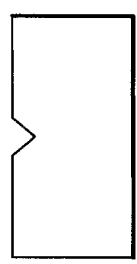
FIG.2A
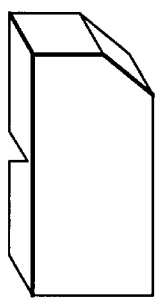
FIG.2
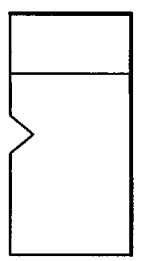
FIG.2D
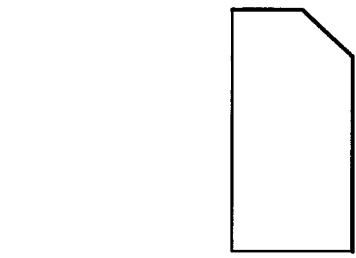
FIG.2E
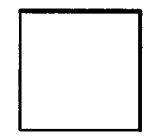
FIG.2F

METHODS AND APPARATUS FOR PROVIDING 3D VIEWPOINT SELECTION IN A SERVER/CLIENT ARRANGEMENT

FIELD OF THE INVENTION

This invention relates generally to graphics processing and display systems and, in particular, to those capable of rendering and displaying three dimensional (3D) models and objects.

BACKGROUND OF THE INVENTION

In a conventional client-server structure or arrangement the server is used to store a 3D model and to deliver it to connected clients. The clients then display the model and support user interaction with the model. For large models containing many polygonal facets, the geometric description of the model (using, for example, vertices, faces and normals) can be larger than a rendered image of the model. The server is thus relied on to render images of the model and to transmit the rendered images to the connected clients.

At the client, an interactive 3D graphics application typically requires a frequent adjustment of viewpoint with respect to the 3D model to be rendered. For example, the user may inspect a 3D model by virtually rotating the model in a manner similar to manually inspecting a physical model that is held in the hand.

Currently, the use of 3D graphics on mobile computing devices is hampered by several factors, including computational power and bandwidth-limited connections to servers. Since 3D models of non-trivial complexity may require a large amount of data to display, the time required to transmit the required data through a bandwidth-limited connection can be objectionable to the user, and/or may make it very difficult or impossible to operate in a real-time, interactive manner. For example, if the user can manipulate a mouse or trackball to change the viewpoint of a displayed model in just a few seconds, but if it requires a server some tens of seconds to transmit an updated image of the model from the new viewpoint to the mobile computing device, then the user's perception of an interactive graphics session is detrimentally affected.

While it is known that server-side rendering has been used in some systems, one significant disadvantage with conventional server-side rendering approaches is that the user is only presented with one particular view of the model. To obtain another view, the user has to request the server to render the model from a new viewpoint. However, choosing that desired viewpoint is often difficult because there is no means to specify the viewpoint by directly manipulating the model.

OBJECTS AND ADVANTAGES OF THE INVENTION

It is a first object and advantage of this invention to provide an efficient and effective solution to the viewpoint selection problem.

It is a further object and advantage of this invention to provide a technique to address the problems inherent in using 3D graphics on a mobile computing device.

It is a further object and advantage of this invention to provide methods and apparatus for improving a client/server arrangement when processing, transmitting and displaying 3D models during the execution of an interactive 3D graphics application.

SUMMARY OF THE INVENTION

The foregoing and other problems are overcome and the objects and advantages of the invention are realized by methods and apparatus in accordance with embodiments of this invention.

There is provided a method and apparatus for operating a client/server graphics processing system of a type that includes a display for displaying images to a user and a user input device whereby a user is enabled to specify a view direction from which to view a model of interest. A scene or model may comprise several independent objects (connected components).

A first step, executed at the server entity, renders a plurality of views (e.g., six views) of the model and transmits the plurality of views to the client entity. A next step, executed at the client, maps individual ones of the plurality of views onto individual ones of a plurality of faces of a structure, and displays the structure on the display. The structure may be a cube or a box, where a box is intended to encompass three dimensional structures that have both square and rectangular bounding faces. Other structure shapes can be used as well. The plurality of views may be texture mapped onto the faces of the structure. In response to the user manipulating the user input device, a next step executed at the client causes a manipulation of the structure displayed on the display for specifying a particular view direction relative to the model. By example, the box can be rotated about one or more of its axes, causing various ones of the views mapped on the box's faces to become visible to the user. Further in response to user input device, the client sends an indication to the server of the user-specified view direction, whereafter the server renders an image of the model, from the user-specified view direction, and transmits the rendered image back to the client for display to the user. The step of rendering a plurality views of the model may operate to first render those views that would be currently visible to the user.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 and FIGS. 2A to 2F are a conceptual representation of a server-executed process for deriving a plurality of views of a model;

FIGS. 3A and 3B are conceptual representations of an original viewpoint on the model (FIG. 3A) and a resulting view of the model from the specified viewpoint (FIG. 3B), while

FIGS. 5A and 5B are each an elevational view of an exemplary embodiment of a structure onto which six or eight, respectively, model views can be mapped, and wherein not all faces have the same size or shape;

DETAILED DESCRIPTION OF THE INVENTION

Figure 1A:
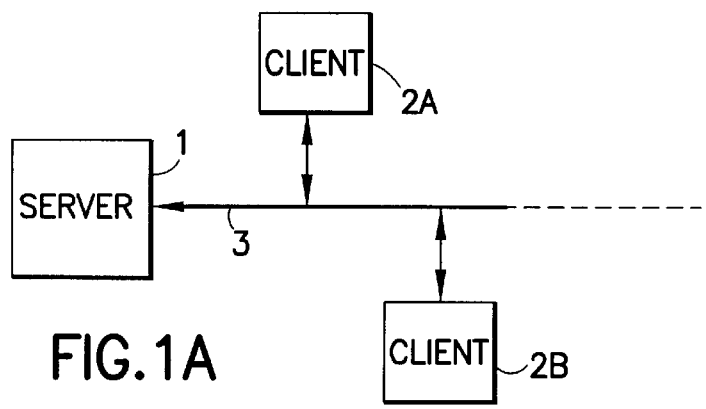
FIG. 1A is simplified block diagram of a client/server graphics processing system arrangement that can be constructed and operated in accordance with an embodiment of this invention.

FIG. 1A depicts an exemplary client/server arrangement wherein a first data processor, referred to as a server 1, is coupled to a plurality of second data processors, referred to as clients 2A and 2B, through a data communications bus or network 3. There may be from one to some large number of clients, and the teachings of this invention are thus not limited to only the two illustrated clients. The clients could be main frame computers, personal computers, mobile computers, such as laptop computers, or any device that includes a computing device and a display capable of displaying a model to a user. The network 3 may be wired network, a wireless network, or some combination of wired and wireless networks.

In general, the server 1 provides data to the clients 2A and 2B, as requested by the clients. In the case of most interest to this invention the data that is provided by the server 1 is graphics data, such as images of background scenes, foreground objects, one or more geometric objects, such as those used to represent a model of interest in a Computer Aided Design (CAD) environment, animations, and the like. Each client is assumed to have some type of user interface, which may be as rudimentary or as sophisticated as desired, whereby a user can command a change of viewpoint of a displayed model. For example, a mouse or trackball can be manipulated by the user to cause a change in viewpoint, although a keyboard, keypad, or even a voice recognition system could be used as well.

Figure 1B:
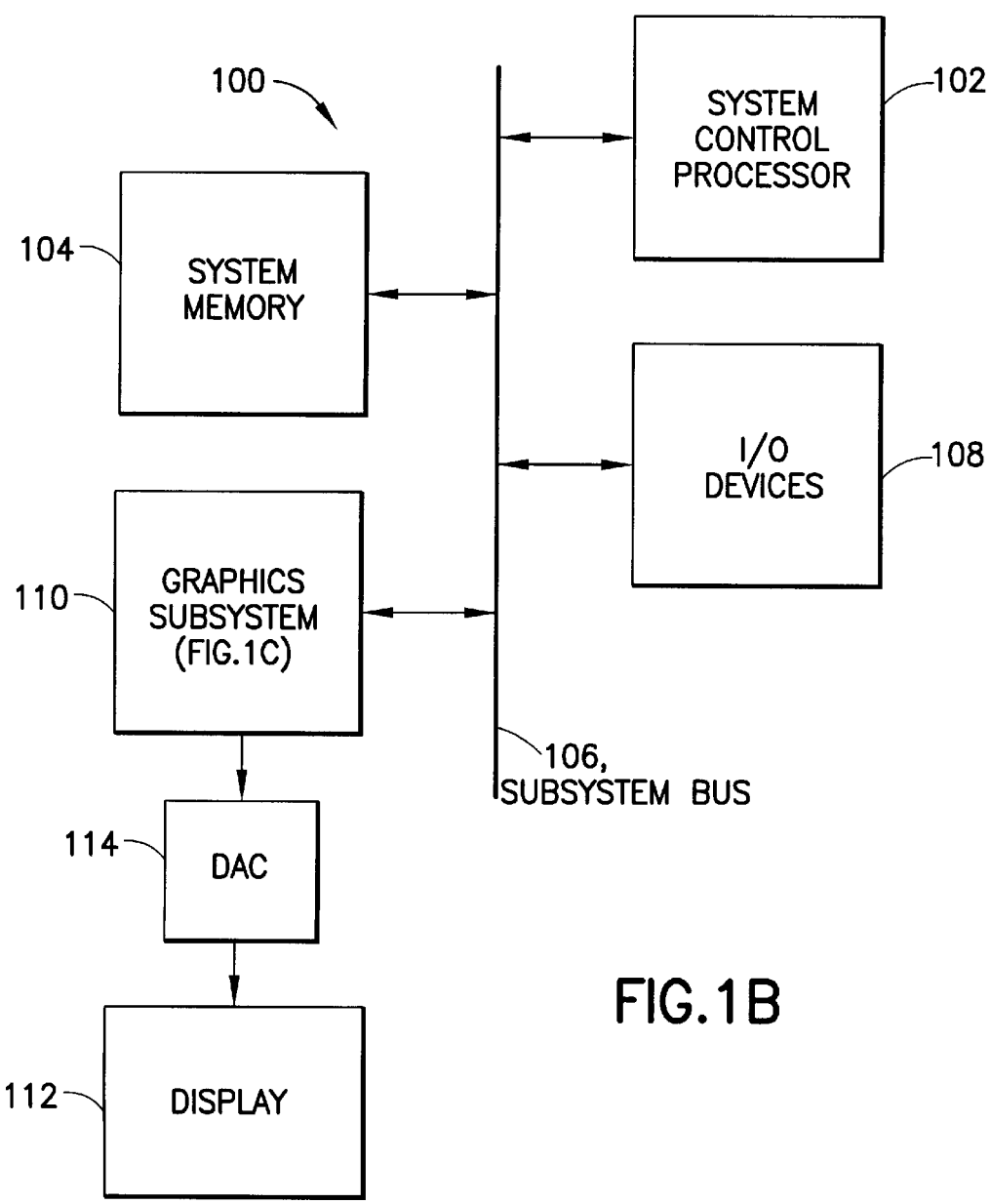
FIG. 1B is a block diagram of an embodiment of a graphics processing system that may embody either the server or the client of FIG. 1A, and that is suitable for practicing this invention.

Reference is now made to FIG. 1B for illustrating the overall architecture of an exemplary graphics processing system 100, also referred to as a graphics visualization system, that is suitable for practicing this invention. The graphics processing system 100 may be considered as an embodiment for the server 1 of FIG. 1A, and possibly any of the clients 2A or 2B, although in general the presence of all of the rendering hardware may not be required at both the server and the clients. That is, the server 1 may perform all of the rendering operations, and then transmit the resulting rendered graphics data to the one or more of the clients 2A and 2B for display. In like manner, the various user interface apparatus and applications may not be required at the server 1, but only at the clients 2A and 2B. Those skilled in the art should readily comprehend these and other distinctions between the server and the client(s).

In any event, the graphics processing system 100 includes a system control processor 102 which is coupled to a system memory 104 via a system bus 106. The system memory 104 includes random access memory (RAM) that stores graphics data defining objects contained in one or more three dimensional models/views. Particularly for the clients 2A and 2B, the system memory 104 may also store an application program running on the system control processor 102 that provides a user-interface to navigate through and/or modify the three-dimensional models/views defined by the graphics data stored in the memory 104. The graphics data that define each object include coordinates and attributes (e.g. color) of primitives. The primitives are geometric entities such as a solid, line, or surface. Typically, the primitives are triangles defined by three vertices. In this case, the system memory 104 may include an ordered list of vertices for triangles that define the surfaces of objects that make up a three dimensional view. In addition, the system memory 104 may store a list of primitive identifiers that correspond to each of the primitives, and transformation matrices that specify how and where the primitives are to be displayed. Input/output (I/O) devices 108 interface to the system control processor 102 via the system bus 106. The I/O devices 108 may include one or more of a keyboard, template, or touch pad for text entry, a pointing device such as a mouse, trackball, or light pen for user input, and speech recognition for speech input. These user-interface related I/O devices may be found only on the clients 2A and 2B, or on both the clients and the server 1. One I/O device is assumed to be some type of connection to the network 3 of FIG. 1A, such as a network adapter, or a optical fiber adapter, or a serial port, or a parallel port, or a wireless transceiver, etc.

The graphics processing system 100 also includes a graphics subsystem 110 that interfaces to the system memory 104 via the system bus 106. The graphics subsystem 110 is of most interest to the teachings of this invention, and is shown in greater detail in FIG. 1C. Generally, the graphics subsystem 110 operates under command from the application program to render the graphics data stored in the system memory 104 for display as an array of pixels in a display area of a display device 112. The display device 112 may utilize raster scan techniques or liquid crystal display techniques to display the pixels. The pixel data generated by the graphics subsystem 110 is in digital form and the display device 112 may require the pixel data to be in analog form. In this case, a digital-to-analog converter (DAC) 114 can be placed between the graphics subsystem 110 and the display device 112 to convert the pixel data from the digital to the analog form that is suitable for driving the display device 112.

In a case of most interest to this invention the rendering hardware of the graphics subsystem 110 may be at the server 1, while the display 110 is located in one of the clients 2A and 2B.

Figure 1C:
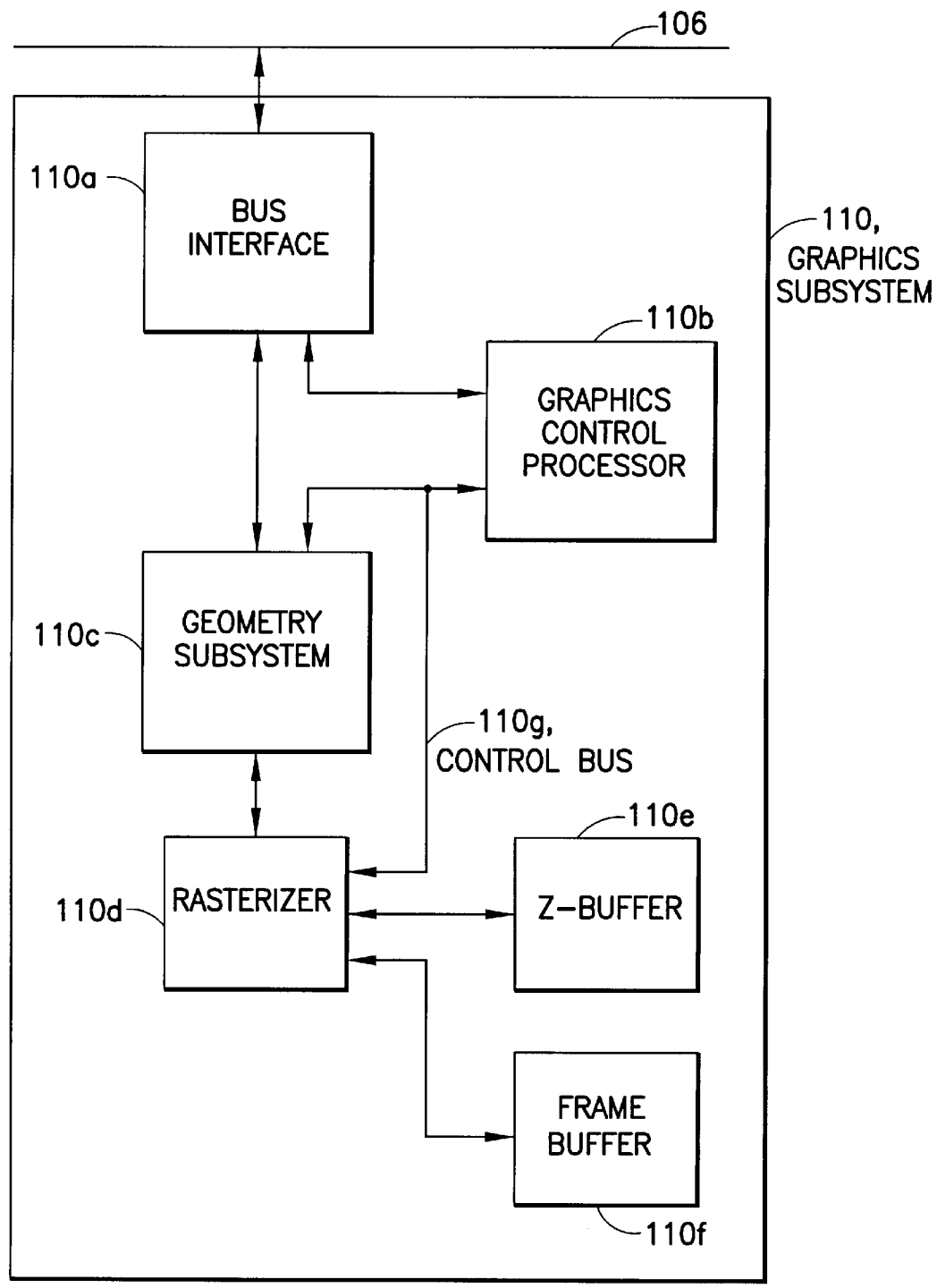
FIG. 1C shows in greater detail the construction of the graphics subsystem block of FIG. 1B.

Referring to FIG. 1C, the graphics subsystem 110 includes a control unit or graphics control processor 110$b$ that supervises the operation of the graphics subsystem 110. Upon receiving a graphics order to render a scene or a model, the control unit or graphics control processor 110$b$ passes the graphics data associated with the graphics order on to a rendering engine or geometry subsystem 110$c$. The rendering engine 110$c$ transforms the graphics data associated with the graphics order from the model coordinate system to a specified view coordinate system and may clip the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization stage 110$d$ that converts the transformed primitives into pixels, and generally stores each primitive's contribution at each pixel. The rendering engine 110$c$ may be organized in a variety of architectures. A more detailed discussion of such architectures may be found in Foley et. al., "Computer Graphics: Principles and Practice", Addison-Wesley, pp. 855–920 (2nd Ed. 1990).

As is conventional, a frame buffer 110$f$ stores pixel data that represents the color for each pixel of the display device 112. The pixel data is periodically output from the frame buffer 110$f$ for display on the display device 112. Preferably, the frame buffer 110$f$ is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in a Z-buffer 110e represent the depth of the object visible at that pixel.

The graphics subsystem 110 may include two frame buffers, wherein one of the frame buffers serves as the active display portion, while the other frame buffer is updated for subsequent display. Either frame buffer may change from being active to inactive in accordance with the needs of the system 100, however the particular manner in which the changeover is accomplished is not relevant to the present invention.

Moreover, if the organization of the frame buffer 110f does not correspond to the display area of the display device 112, a scaling operation can be performed on the pixel values stored in the frame buffer 110f, thereby shrinking or enlarging the image stored in the frame buffer. Scaling up may be obtained by duplicating pixel color values or by performing linear or bilinear interpolations between color values to fill gaps between the original pixel values stored in the frame buffer 110f. Scaling down may be obtained by averaging color values of adjacent pixels. As will be made apparent below, after the server renders a model of interest, using a specified viewpoint, into the frame buffer 110f, the rendered data is then extracted from the fame buffer 110f and transmitted over the network 3 to a requesting one of the clients 2A or 2B. The rendered data may or may not be also displayed at the server 1.

In a presently preferred embodiment the graphics subsystem 110 is constructed and operated in accordance with the teachings of this invention so as to be responsive to user specified viewpoints, as well as to render various views of a model for display to the user, as described below.

In accordance with the teachings of this invention the server 1 generates several views of the model, e.g. six views, and transmits all of these views to the client 2A and/or 2B. The client 2A or 2B then displays all views by mapping the views, such as by texture-mapping, onto a simple geometric shape such as a cube, which may also be referred to herein simply as a box. For the sake of simplicity, it will be assumed that the server 1 renders six views that the client 2A maps onto a three dimensional cube shape for viewing by a user. However, it will be understood that the teachings of this invention also covers different numbers of views and different geometries, e.g. four views mapped onto a tetrahedron, or 20 views mapped onto a dodecahedron, or even two views mapped onto opposing sides of a plane.

For example, FIG. 2 shows a case where the server 1 generates six views (FIG. 2A to FIG. 2F) of an exemplary 3D model. The 3D model may be described by polygonal data structures comprised of vertices, edges, faces, etc. In this example FIG. 2A is a top view, FIG. 2D is bottom view, FIG. 2B and FIG. 2E are a back view and a front view, respectively, and FIG. 2C and FIG. 2F are a right side view and a left side view, respectively. These six views are transmitted from the server 1 to one or more of the clients 2A and/or 2B over the network 3.

Figure 3A:
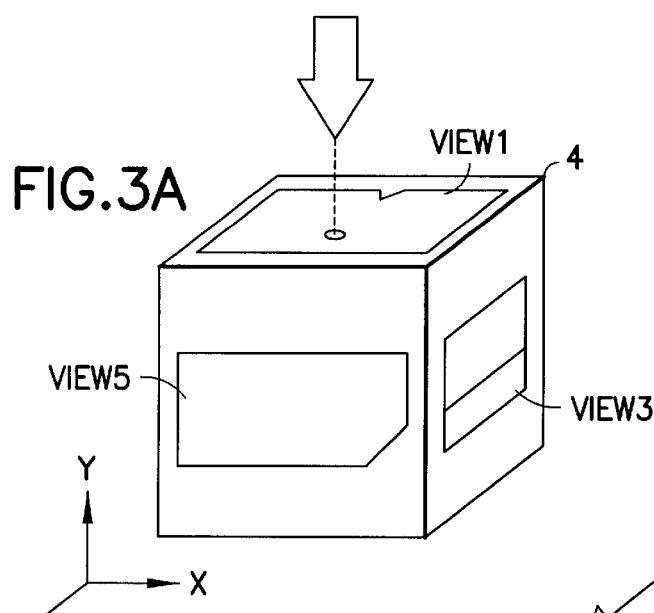

Referring now to FIG. 3A, the receiving client, assumed for simplicity in the remainder of this discussion to be client 2A, maps the six views onto the surface of a cube 4. The mapping is preferably a texture-mapping, and the views are preferably mapped in a logical fashion so as to coincide with the geometry of the 3D model (i.e., the top and bottom views are mapped on opposite sides of the cube 4, as are the front and back views and the left and right side views.)

The user can then manipulate the cube 4 and select a viewing direction (VD) onto the 3D model. The images that are mapped onto the sides of the cube 4 thus provide visual feedback and guide the user in selecting the desired orientation. Once the user has selected a suitable orientation, the server 1 renders the object for that orientation and transmits the resulting image back to the client 2A for display.

Figure 3B:
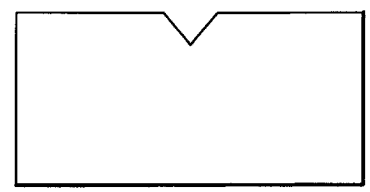

In the example shown in FIG. 3A the user has set the viewing direction to be perpendicular to the top of the cube 4, i.e., normal to the surface onto which FIG. 2A is mapped. FIG. 3B shows the resulting image that is rendered by the server 1 and transmitted back to client 2A for display.

It should be noted in this case that the image is identical to the original FIG. 2A image that was originally rendered by the server 1 and transmitted to the client to be mapped onto the cube 4. This being the case, the client 2A may be operable to recognize that the user has selected a viewing direction that coincides with one of the originally rendered views, and simply provide same for display to the user.

In this regard, one may use a small threshold around the viewing direction to determine whether a new view should be generated. Only if the new viewing direction differs enough from the current viewing direction does the client 2A request an image for the new view. The difference between two viewing directions can be simply expressed as a magnitude of the dot product of the vectors along the two viewing directions.

Further in this regard, the client 2A may request an image for a new view if the user takes some explicit positive action (e.g., a mouse or button click), or if the user does not interact with the model for more than a predetermined period of time, or if the user actively terminates interacting with the model (e.g., by releasing a mouse button). Various combinations of the foregoing conditions may be used as well to trigger the request of a new view.

Of course, if the original six views were rendered by the server 1 so as to be simplified images lacking in some details or, for example, simplified in color and/or texture, then it may be desirable to have the server rerender the requested view, but with enhanced detail, color and/or texture.

This technique can be advantageously used to reduce the time to generate the views, and different rendering techniques could be used to produce the initial views and the subsequent views. For example, a coarse model could be quickly rendered six times using OpenGL calls, while subsequent views may be ray-traced to obtain higher quality images.

Further in accordance with the teaching of this invention the server 1 may render the plurality of views to have a rendering quality that differs from the rendered image of the model. The rendered quality could be determined, by example, by the number of light sources used or by the rendering method (e.g., ray tracing).

Also in accordance with the teaching of this invention the server 1 may render the plurality of views to have display attributes that differ from the rendered image of the model. The display attributes could be, by example, wireframe versus shaded display, Gouraud shaded versus Phong shaded, texture mapping or no texture mapping, etc.

Figure 3C:
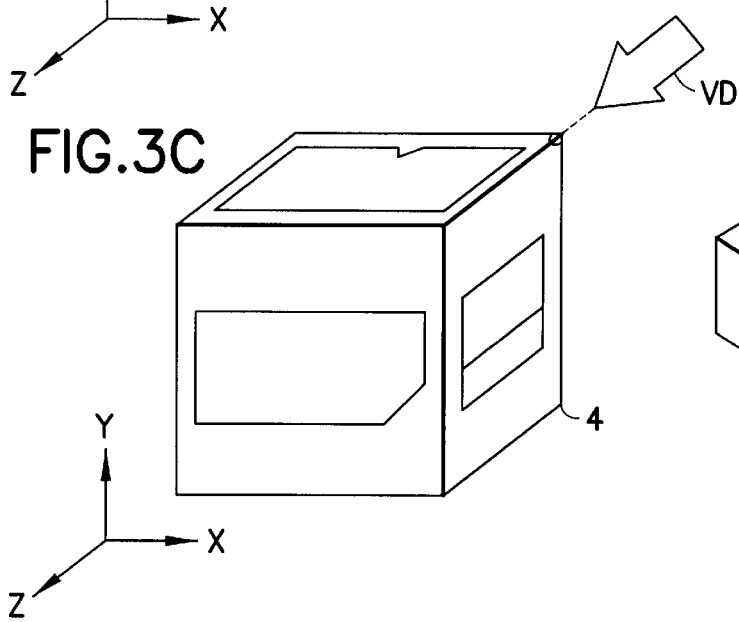
FIGS. 3C–3F represent two viewpoint changes and the resulting view of the model for each of the two new viewpoints.
Figure 3D:
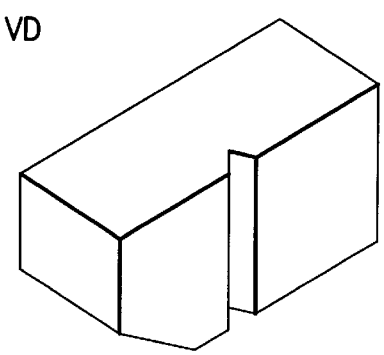

In the example shown in FIG. 3C the user has set the viewing direction to be into a corner of the cube 4 such that three surfaces of the cube 4 are visible, in particular those having FIG. 2A, FIG. 2B and FIG. 2C mapped thereon. FIG. 3D shows the resulting image that is rendered by the server 1 and transmitted back to client 2A for display. Note that not all of model shown in FIG. 2C is visible when using this viewing direction.

In the example shown in FIG. 3D the user has set the viewing direction to be into an edge of the cube 4 such that two surfaces of the cube 4 are visible, in particular those surfaces having FIG. 2C and FIG. 2D mapped thereon. FIG. 3F shows the resulting image that is rendered by the server 1 and transmitted back to client 2A for display.

Figure 3E:
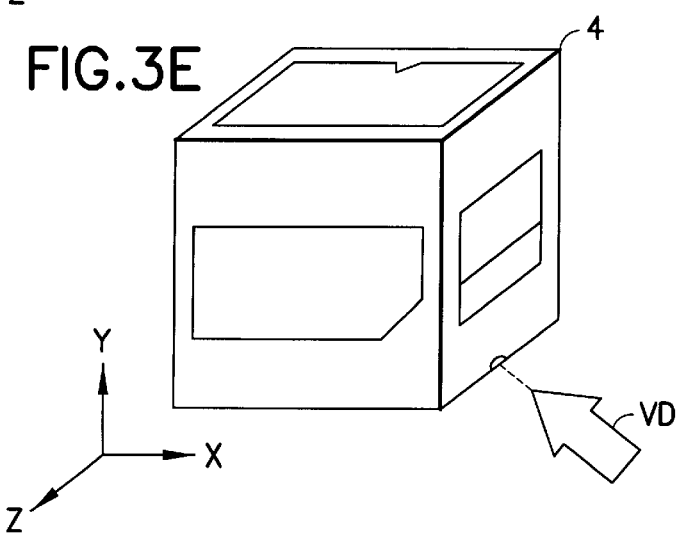
Figure 3F:
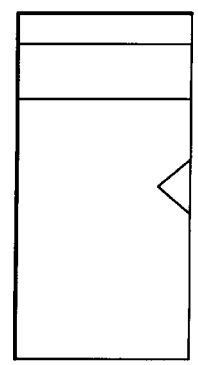

In FIGS. 3A, 3C and 3E the cube 4 has been shown to be fixed and the viewing direction has been rotated about the cube. However, in practice it may instead be preferable to fix the viewing direction, and to then employ the client's user interface, such as a mouse or trackball, to cause a rotation of the cube 4 about axes passing through the various faces.

It may be desirable that a spatial relationship between the light sources and the scene remain constant. The user interface may still present both paradigms, i.e. a motion of the mouse to the left may either move the model to the left or rotate the viewer around the model to the left—this will result in opposite direction of movement on the screen.

Figure 4A:
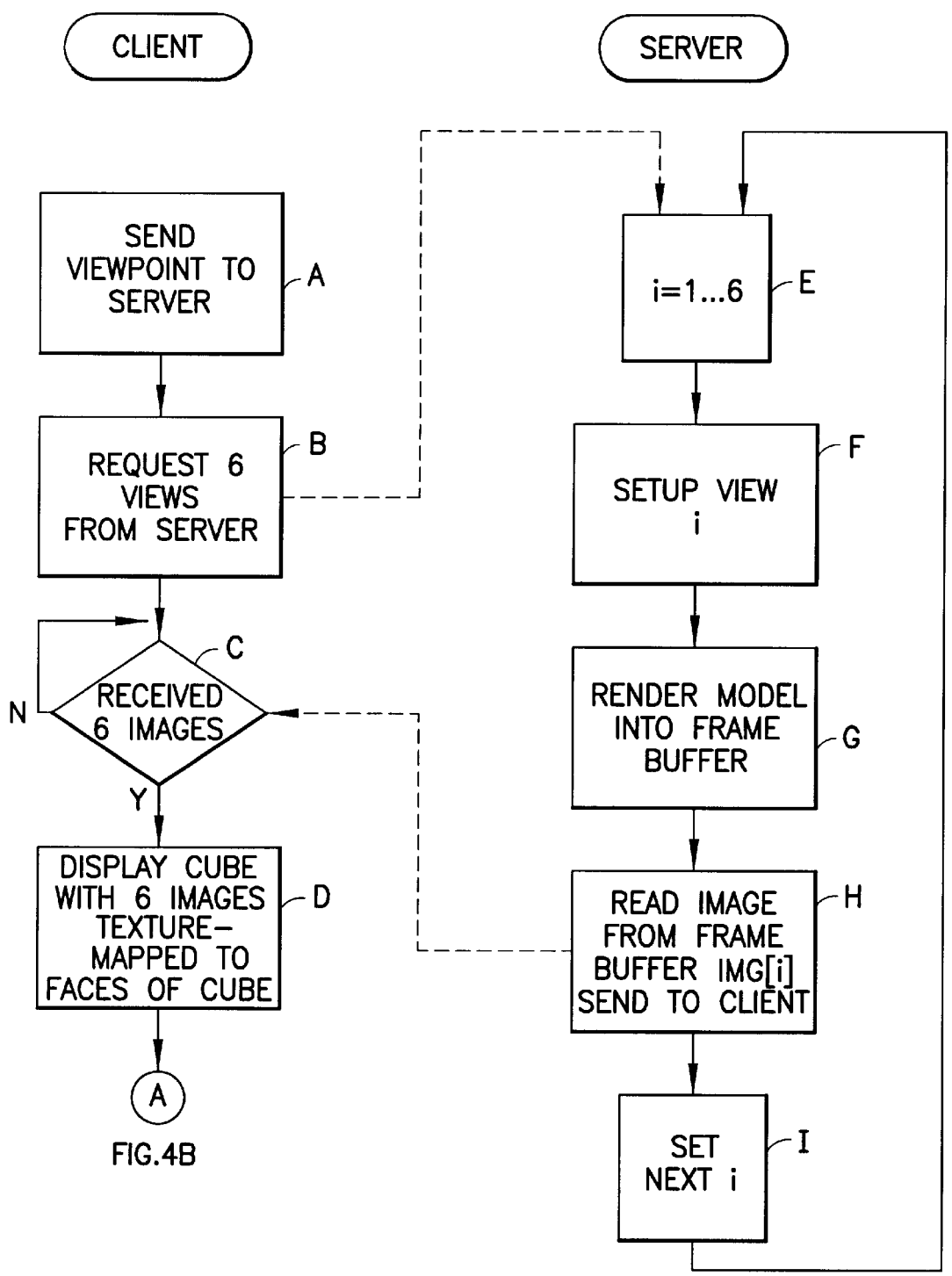
FIGS. 4A and 4B are a logic flow diagram of a method in accordance with the teachings of this invention.
Figure 4B:
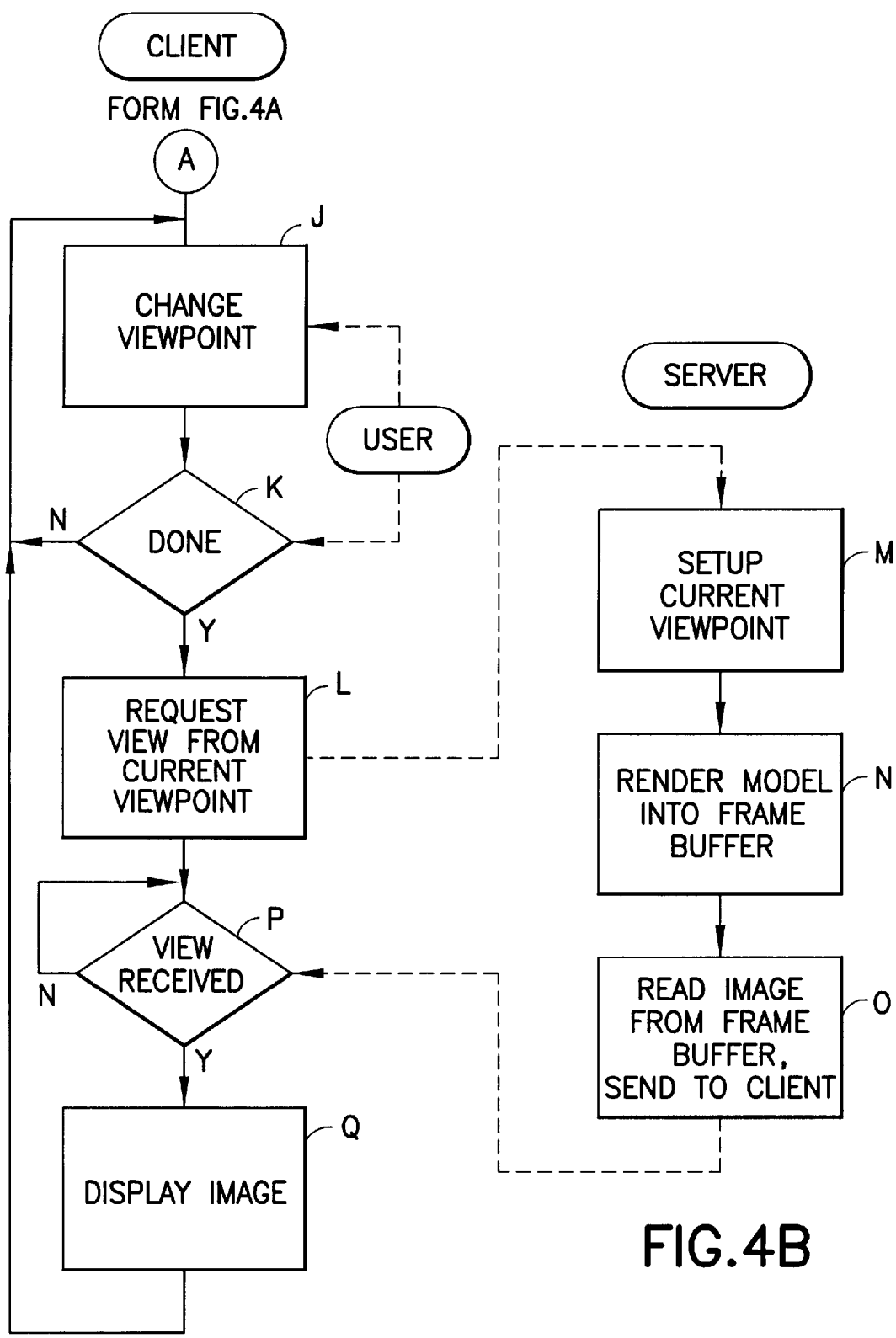

FIGS. 4A and 4B are a logic flow diagram of a method in accordance with the teachings of this invention. Starting with FIG. 4A, the following steps describe the preferred embodiment of this invention.

In Steps A and B the client 2A sends a request to the server to render some number of canonical views, for example six, of the object. These six canonical views are defined by the three axes of a coordinate system centered in the object to be viewed. Alternatively, the viewpoint may be defaulted by the server 1 as a function of the geometry of the object, and need not be transmitted by the client 2A. Referring now to Steps E–I, for each of these canonical views, the server 1 sets up the appropriate viewpoint, e.g. on the positive x-axis, and renders the model from that viewpoint into its frame buffer 110f. The server 1 then reads the rendered image from the frame buffer 110f and stores it in system memory. After all six views have been rendered and stored, the server 1 transmits the images to the client 2A. Alternatively, the server 1 transmits the views sequentially as they are rendered and read from frame buffer 110f.

In either case, the client 2A waits to receive the six images or views of the model (Step C), and then uses these images as texture maps and applies them to the six sides of the cube 4 as described above. The dimensions of the cube 4 are determined by the size of the images. The texture-mapped cube 4 is then displayed to the user.

Referring now to FIG. 4B at Steps J and K, at some future time the user provides an input to change the viewpoint (such as between FIG. 3A and FIG. 3C), and the client 2A computes and displays new views onto the texture-mapped cube 4. In this case the user manipulates the textured cube 4 using a mouse, or some other suitable input device, in order to select an appropriate viewpoint. When, by example, the user releases the mouse button, a request is sent to the server 1 to render a new view (Step L). Alternatively, the user can explicitly request rendering of a new view.

In either case, when the user has indicated the desired viewpoint (such as with a mouse click, or after some predetermined period of time with no further input, or by an explicit command), at Step L the client 2A sends a request to the server 1 to render the object from the chosen (current) viewpoint.

The viewpoint can be specified to the server 1 in any number of ways, e.g. by specifying the eye position and two vectors to define the viewing direction and an up-vector. Other techniques to specify the camera parameters can also be used. Typically, the viewpoint is specified in world coordinates, in particular when the scene is composed of several objects each of which has its own, local coordinates system.

Besides the view parameters, the client 2A preferably also transmits to the client 1 the desired pixel resolution of the images representing the view. However, the teaching of this invention does not require the server 1 to have any specific knowledge as to how the client 2A maps the images to the box.

There are two aspects related to the lighting of the model that should be considered. In the first case, one might wish to ensure that the lighting of the views rendered on the server 1 and transmitted to the client 2A is consistent with how the three dimensional model would actually be rendered on the client 2A. For example, if there is one fixed light source on the client 2A, the part of the model that faces the light source will appear lit. As the model is manipulated, various parts of it become lit. To reflect the same behavior for the server-rendered views, as the model is rendered from a particular viewpoint, the light source would be caused to move with the viewpoint so as to achieve the same effect as on the client 2A. As the different views are mapped or pasted onto the faces of the box, it would appear that there are multiple light sources. However, as soon as a face of the box becomes parallel to the projection plane, a consistent lighting is achieved.

In the second case, one might wish to ensure that the box, and its sides, appear as lit by one light source. In this case the location of the light source on the server 1 is kept fixed as the different views are rendered.

Returning again 4B, at Steps M, N and O the server 1 sets up the current viewpoint, renders the model from the chosen viewpoint into the frame buffer 110f, and reads the resulting image from its frame buffer 110f and sends the image to the client 2A over the network 3. Upon receiving the image at Step P, the client 2A at Step Q replaces on the display 112 the image of the texture-mapped cube 4 with the newly rendered image (as in, by example, FIG. 3D). Control then passes back to Step J so that when the user desires to choose a new viewpoint, the client 2A switches back to displaying the texture-mapped cube 4.

In the foregoing it should be realized that the views rendered on the server 1 could be transmitted to the client 2A in compressed format or, for the case where there is no network, they could be stored in compressed format.

Preferably the six original views (FIG. 2A to FIG. 2F) are retained in the memory 104 of the client 2A. When the user employs the mouse or some other suitable input device to select a new viewpoint, the client 2A automatically switches back to the display of the textured cube 4, using the six original stored images, to facilitate selection of a new view direction by the user.

Of course, in some embodiments it may be desirable to continually display the cube 4, such as by displaying a small version of the cube 4 in one corner of the display 112, while displaying the image from the selected viewpoint in a more prominent location on the display.

The foregoing technique beneficially provides for a reduction in computational limitations of the client 2A, since the display of a simple geometric shape having a few texture-mapped surfaces, such as the cube 4, does not require a significant number of calculations.

Having described embodiments of methods and apparatus made possible by the teaching of this invention, various enhancements to and modifications of these embodiments will now be described.

After rotating the box to select a desirable viewpoint, an image is generated on the server 1 and downloaded to the client 2A. The downloaded image shows the model from the selected viewpoint. The image is rendered on the server 1 using a particular viewport size, but may typically be displayed on the client 2A using a different viewport. Also, other camera parameters, such as the zoom factor, may be different between the client 2A and server 1.

Therefore, on the client 2A the image is preferably scaled in order to be shown at the proper size.

The total scale factor S is composed of three components:

$$S = S_1 \times S_2 \times S_3.$$

The scale factor $S_1$ accounts for different viewports and is computed as min ($W_c/W_s$, $H_c/H_s$), where W and H are the width and the height of the viewport on the client (c) and the server (s), respectively. The application of this scale factor ensures that for equal camera conditions, the image rendered on the server 1 is displayed at the same size as an image generated by rendering the model itself on the client 2A.

The scale factor $S_2$ accounts for zooming on the client 2A.

Figure 6:
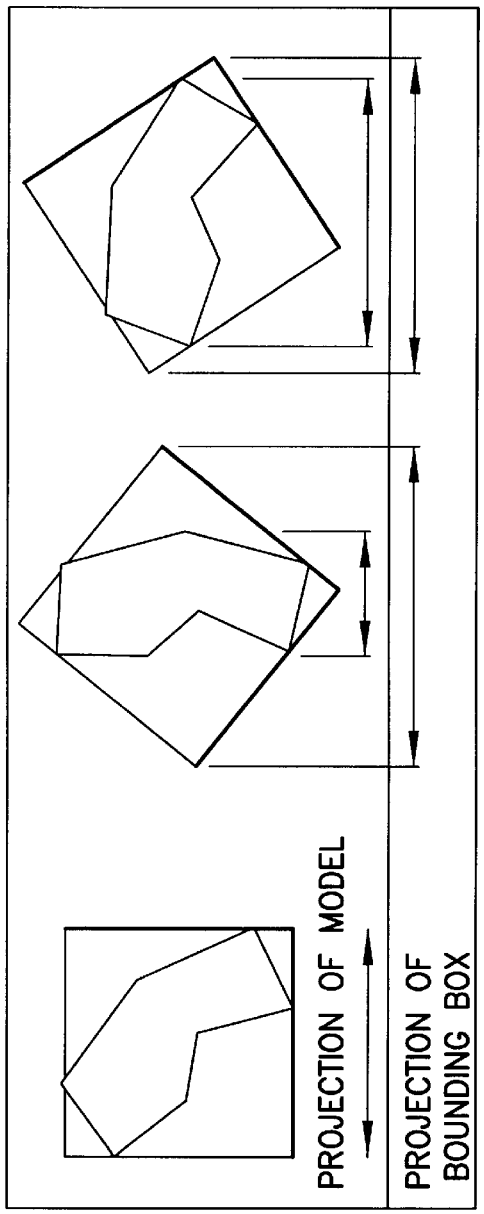
FIG. 6 illustrates a projection of a model and various projections of a bounding box for different orientations of the bounding box.

The scale factor $S_3$ introduces a subjective visual correction to account for the effect that the box used for viewpoint selection may take more screen space than the rendered image. Consequently, the user may perceive the transition between the display of the box and the display of the image as if the object shrinks. It should be noted that this scale factor depends on the rotation angle of the box. FIG. 6 illustrates the effect first in two dimensions.

FIG. 6 shows that the projection of the bounding box, and hence what the user perceives as the size of the object when manipulating the viewpoint, is larger than the projection of the model itself. Therefore, it is preferred to adjust the image to better match the (subjective) user expectations. The user's expectations are determined primarily by the size of the bounding box.

FIG. 6 also illustrates that the difference between the projection of the bounding box and the projection of the model depends on how the model is positioned inside the bounding box. Therefore, to properly scale the image the size of the model's projection should be known. The size of the model's projection can be readily computed by projecting the vertices of the model's convex hull and determining the extreme points among those projected vertices along the direction of projection. However, computing the convex hull of a model can be expensive, and more efficient methods may be desirable.

As an alternative, what will now be described is a computationally less expensive, but also less accurate, method to approximate the size of the model's projection.

The approach is to use the size of the bounding box without any regard for the size of the model's projection. Obviously, when the viewpoint is chosen such that only one face of the bounding box is visible, the techniques requires that $S_3=1$.

Figure 7:
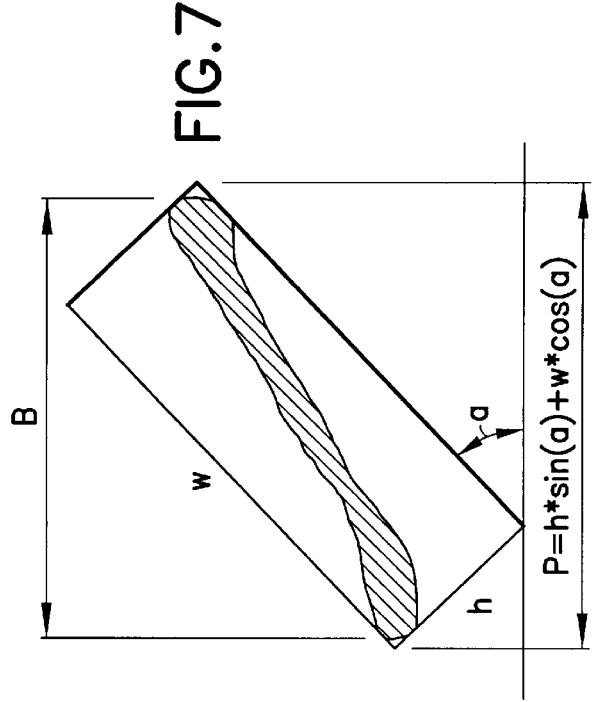
FIGS. 7–9 are useful in explaining a preferred technique to approximate the size of a projection of the model.
Figure 8:
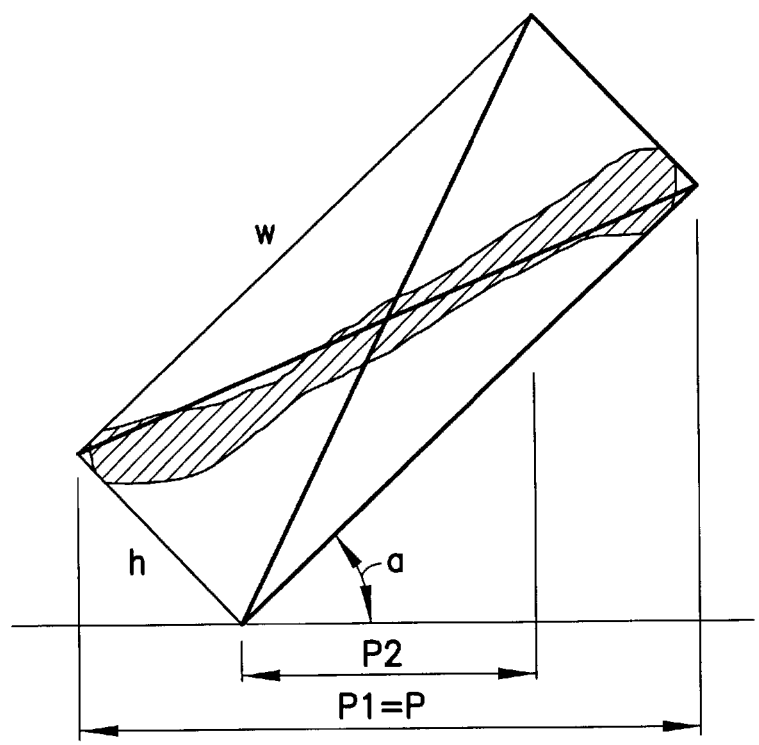

Referring to the two dimensional example shown in FIG. 7, let w and h be the lengths of the original bounding box sizes and a be the angle between one of the sides and the positive horizontal axis. Let P be the length of the projection of the bounding box along the horizontal direction. Then $P=h*\sin(a)+w*\cos(a)$, for any a in [0,180]. To scale an image of the object rotated by a with respect to the horizontal axis, one would have to fit the bounding box of the new projection received from the server 1 to the segment B. An exact determination of the extent of B would require knowledge of the convex hull of the object. To avoid such a computation, which may be quite complex for objects with a large number of vertices, it is preferred instead to employ a heuristic that is dependent on the shape of the object and its position within the initial bounding box. According to this heuristic the scaling factor S3 is a fixed number selected in the interval I=[min{P1, P2}/P, 1.0], where P1 and P2 are the diagonal projections along the horizontal direction (see FIG. 8). For example, one could select the median value: S3= (P1+P2)/(2*P). For the cases when a=0 or a=90, P1=P2=P and hence the interval reduces to a single point, i.e., S3=1. Thus the scaling factor explicitly depends on the angle a of projection and implicitly depends on the shape of the object. The more elongated the object is along the direction of one of its bounding box diagonals than along the other, the larger the interval I becomes.

Figure 9:
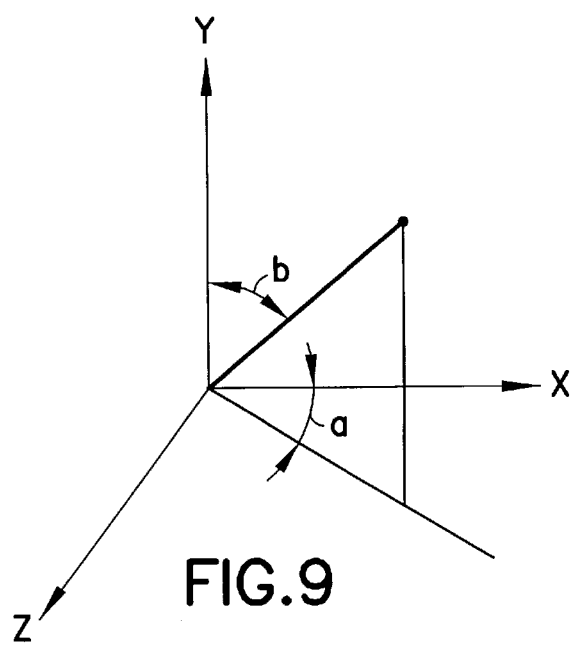

In the three dimensional case, a similar interval would be computed by taking the smallest and the largest of the diagonal projections. For cases when the projection plane is parallel to one of the initial bounding box faces, the three diagonals project onto equal length segments, and again S3=1 (for orthogonal projections). In general, S3 is dependent on two angles a and b that describe the rotation of the object with respect to a three dimensional system of coordinates (see FIG. 9), and the three dimensional shape of the object. The interval I becomes: I=[min {P1, P2, P3}/P, max {P1, P2, P3}/P]=min {P1, P2, P3}/P, 1.0], where P1, P2, P3 are the projections of the box diagonals along a direction parallel with either the horizontal or vertical direction (the direction along which the projection of the image received from the server is largest).

It should be clear that, based on the foregoing description, those skilled in the art may derive modifications to the presently preferred embodiments. For example, the number and size of the faces to present the views can be different. That is, it is not necessary that each face be the same size and shape. For example, instead of using a cube the six views could be displayed on faces of an elongated four sided bar-like structure, as in FIG. 5A, or eight views could be displayed on faces of an elongated six sided bar-like structure, as in FIG. 5B. Other, more regular, shapes could also be used, including platonic solids such as tetrahedron or octahedron.

Also, the order of generating and transmitting views may differ in different implementations. For example, it may be desirable for the server 1 to first generate (and transmit) those views that face the viewer at the current or default viewpoint. In this case the client 2A could texture map these views as they are received to cube 4, and then display the cube with those views visible to the user, while the server 1 is still rendering and/or transmitting those views that are not currently visible to the user. In this embodiment the logic of Steps C and D of FIG. 4A would be modified to first wait for the receipt of at least one view before proceeding to Step D to begin mapping the received view(s) to the face(s) of the cube 4, and displaying the cube 4.

The teachings of this invention can also be practiced outside of a client-server environment. For example, a system may employ the invention to ensure interactive viewpoint selection, notwithstanding having limited rendering capabilities that prevent the full 3D model from being rendered interactively.

It should also be noted that the foregoing teachings have been described in the context of using a model described by polygonal data structures comprised of vertices, edges, etc. However, based on these teachings those skilled in the art may recognize how to extend these teachings to other representations of models, including freeform surfaces such as patches and splines. These teachings are also well suited for the visualization of other data types such as scalar/vector fields. However, any and all such modifications are deemed to fall within the scope of the teaching of this invention.

Furthermore, the teachings of this invention are not to be construed to be limited to only the specific examples of numbers of views and structures onto which to map the views, such as cubes, that were described above, as other structures having differing numbers of faces and/or face shapes could be used as well, as was made evident at least in FIGS. 5A and 5B.

It should also be apparent that this invention provides an enhancement to and improvement in a user interface for a graphics visualization system, wherein a user is enabled to rapidly and accurately specify a viewpoint from which to view a model or object of interest by manipulating a user input device to cause a manipulation of a structure on which a number of predetermined views of the model or object of interest are arrayed.

It is also noted that texture mapping is described in many standard texts on computer graphics, e.g. George Wolberg, "Digital Image Warping", IEEE Computer Society Press, 1992,pp. 188–204; or Mason Woo et al., "OpenGL Programming Guide", 2nd edition, Addison Wesley, 1997, pp. 317–372. However, the teachings of this invention are not limited to only texture mapping the views to the box or other object that is manipulated by the user. For example, if one restricts the display of the texture-mapped box to orthographic projection (i.e., no perspective distortion), then simple scaling and shear operations applied to the image can be used to replace texture mapping. This is particularly useful for those clients that do not (efficiently) support texture mapping, but provide basic image manipulation routines (affine image transformation).

It has been described that after the initial transfer of six (or any number of views), additional views are requested one at a time. However, this can be generalized to include any number of views rendered and received as a result of a viewpoint change request, each of which may also be pasted onto the faces of a box (or other shape). The selection of a new view direction may subsequently be made by either manipulating the new views, or by reverting to the initial box (shape).

It should be further realized that this invention is directed as well to a computer program embodied on a computer-readable medium for providing a user interface for a graphics visualization system of a type that includes a display for displaying images to a user and a user input device whereby a user is enabled to specify a view direction from which to view an image of a model of interest. The computer program includes a mapping code segment, responsive to a plurality of views of the model, for mapping individual ones of the plurality of views onto individual ones of a plurality of faces of a structure and for displaying the structure on the display. The computer program further includes a view direction specification code segment that is responsive to the user manipulating the user input device for causing a manipulation of the displayed structure. The view direction specification code segment is further responsive to the user input device for transmitting an indication of a user-specified view direction relative to the model. The computer program also includes a display code segment that is responsive to a receipt of an image of the model, rendered from the user-specified view direction, for displaying the received image to the user on the display.

Thus, while the invention has been particularly shown and described with respect to preferred embodiments thereof, it will be understood by those skilled in the art that changes in form and details may be made therein without departing from the scope and spirit of the invention.

What is claimed is:

1. A user interface for a graphics visualization system, comprising:

a display for displaying images to a user; and a user input device whereby a user is enabled to specify a view direction from which to view an image of a model of interest; and a controller having an input coupled to said user input device and an output coupled to said display, said controller being responsive to the user manipulating said user input device for causing a manipulation of an image of a structure displayed on said display, said structure comprising a plurality of faces on individual ones of which are displayed an individual one of a plurality of predetermined views of the model.

2. A system as in claim 1, wherein said graphics visualization system is comprised of a first data processor, and further comprising an interface to a second data processor from which the plurality of predetermined are views received.

3. A system as in claim 2, wherein said controller is further responsive to said user input device for sending an indication to said second data processor of a user-selected view direction relative to the model.

4. A system as in claim 3, wherein said controller is further responsive to a receipt from said second data processor of an image of the model, rendered from the user-selected view direction, for displaying the received image to the user on said display.

5. A system as in claim 2, wherein said first data processor is a client entity, wherein said second data processor is a server entity, and wherein said first and second data processors are bidirectionally coupled together through a wired or a wireless data communications interface.

6. A system as in claim 1, wherein said controller texture maps the individual one of the plurality of predetermined views of the model onto individual ones of the faces of the structure.

7. A system as in claim 1, wherein there are six predetermined views of the model, and wherein the structure has six faces.

8. A system as in claim 7, wherein the structure is a box.

9. A method for operating a client/server graphics processing system, comprising steps of:

at the client, providing a display for displaying images to a user and a user input device whereby a user is enabled to specify a view direction from which to view a model of interest;

at the server, rendering a plurality views of the model and transmitting the plurality of views to the client;

at the client, mapping individual ones of the plurality of views onto individual ones of a plurality of faces of a structure and displaying the structure on the display;

in response to the user manipulating the user input device, causing a manipulation of the structure displayed on the display for specifying a particular view direction relative to the model;

further responsive to user input device, sending an indication to the server of the user-specified view direction;

rendering an image of the model, from the user-specified view direction, at the server; and transmitting the rendered image back to the client and displaying the received image to the user on the display.

10. A method as in claim 9, wherein the step of mapping includes a step of texture mapping individual ones of the plurality of views onto individual ones of the faces of the structure.

11. A method as in claim 9, wherein there are six views of the model, and wherein the structure has six faces.

12. A method as in claim 11, wherein the structure is a box.

13. A method as in claim 9, wherein the step of rendering a plurality views of the model first renders those views that would be currently visible to the user.

14. A method as in claim 9, wherein the step of displaying the received image includes a preliminary step of scaling the image.

15. A method as in claim 14, wherein the step of scaling scales the image to account for a difference in viewport size between the client and the server.

16. A method as in claim 14, wherein the step of scaling scales the image to account for a difference in zoom factor between the client and the server.

17. A method as in claim 14, wherein the step of scaling scales the image to apply a subjective visual correction to account for a difference in screen space used by the structure and the mapped views.

18. A method as in claim 17, wherein the step of scaling to apply a subjective visual correction applies a heuristic that considers a shape of the model and its position within the structure.

19. A method as in claim 9, wherein the step of rendering a plurality of views renders the plurality of views to have a resolution that differs from the rendered image of the model.

20. A method as in claim 9, wherein the step of rendering a plurality of views renders the plurality of views to have a rendering quality that differs from the rendered image of the model.

21. A method as in claim 9, wherein the step of rendering a plurality of views renders the plurality of views to have display attributes that differ from the rendered image of the model.

22. A method as in claim 9, wherein the step of sending an indication is executed only if the user-specified viewing direction differs from a current viewing direction by more than a predetermined threshold amount.

23. A method as in claim 9, wherein the step of sending an indication is executed only if the user takes an explicit positive action.

24. A method as in claim 9, wherein the step of sending an indication is executed only if the user does not interact with the model for more than a predetermined period of time.

25. A method as in claim 9, wherein the step of sending an indication is executed only if the user actively terminates interacting with the model.

26. A computer program embodied on a computer-readable medium for providing a user interface for a graphics visualization system of a type that includes a display for displaying images to a user and a user input device whereby a user is enabled to specify a view direction from which to view an image of a model of interest, said computer program comprising:

a mapping code segment, responsive to a plurality of views of the model, for mapping individual ones of the plurality of views onto individual ones of a plurality of faces of a structure and for displaying the structure on the display; and a view direction specification code segment that is responsive to the user manipulating said user input device for causing a manipulation of said structure displayed on said display, said view direction specification code segment being further responsive to said user input device for transmitting an indication of a user-specified view direction relative to said model.

27. A computer program as in claim 26, and further comprising a display code segment that is responsive to a receipt of an image of the model, rendered from the user-specified view direction, for displaying the received image to the user on the display.

* * * * *